United States Patent [19]
Morimoto

[11] Patent Number: 5,318,241
[45] Date of Patent: Jun. 7, 1994

[54] MAGNETIC TAPE APPARATUS
[75] Inventor: Takao Morimoto, Sanda, Japan
[73] Assignee: Mitsubishi Denki Kabushiki Kaisha, Tokyo, Japan
[21] Appl. No.: 982,580
[22] Filed: Nov. 27, 1992
[30] Foreign Application Priority Data
Nov. 29, 1991 [JP]  Japan .................. 3-316718
[51] Int. Cl.$^5$ ........................... G11B 15/48
[52] U.S. Cl. .................................. 292/204
[58] Field of Search ............ 242/201, 202, 204, 206, 242/208, 209, 210; 360/85, 95, 96.1, 96.2, 96.3, 96.4

[56]  References Cited
U.S. PATENT DOCUMENTS

| | | | |
|---|---|---|---|
| 4,563,711 | 1/1986 | Takai | 242/204 X |
| 4,889,951 | 2/1990 | Okada et al. | 242/204 |
| 4,930,028 | 5/1990 | Kunimaru et al. | 360/85 |
| 5,140,475 | 8/1992 | Tanaka | 242/204 X |

FOREIGN PATENT DOCUMENTS

52-42044 10/1977 Japan .
64-66852 3/1989 Japan .

Primary Examiner—Daniel P. Stodola
Assistant Examiner—John P. Darling

[57]  ABSTRACT

A magnetic tape apparatus for loading and unloading magnetic tape having first and second rotatable reel winders with first and second reel brake arms for providing a braking force to the reel winders. A locking device is provided for locking the first reel winder when unloading the magnetic tape upon release of the first reel winder by the first brake arm while allowing the second reel winder to freely rotate.

7 Claims, 15 Drawing Sheets

MAGNETIC TAPE APPARATUS

BACKGROUND OF THE INVENTION

This invention relates to a magnetic tape apparatus and, more particularly, to a magnetic tape apparatus having a reel brake mechanism.

Figure 12:
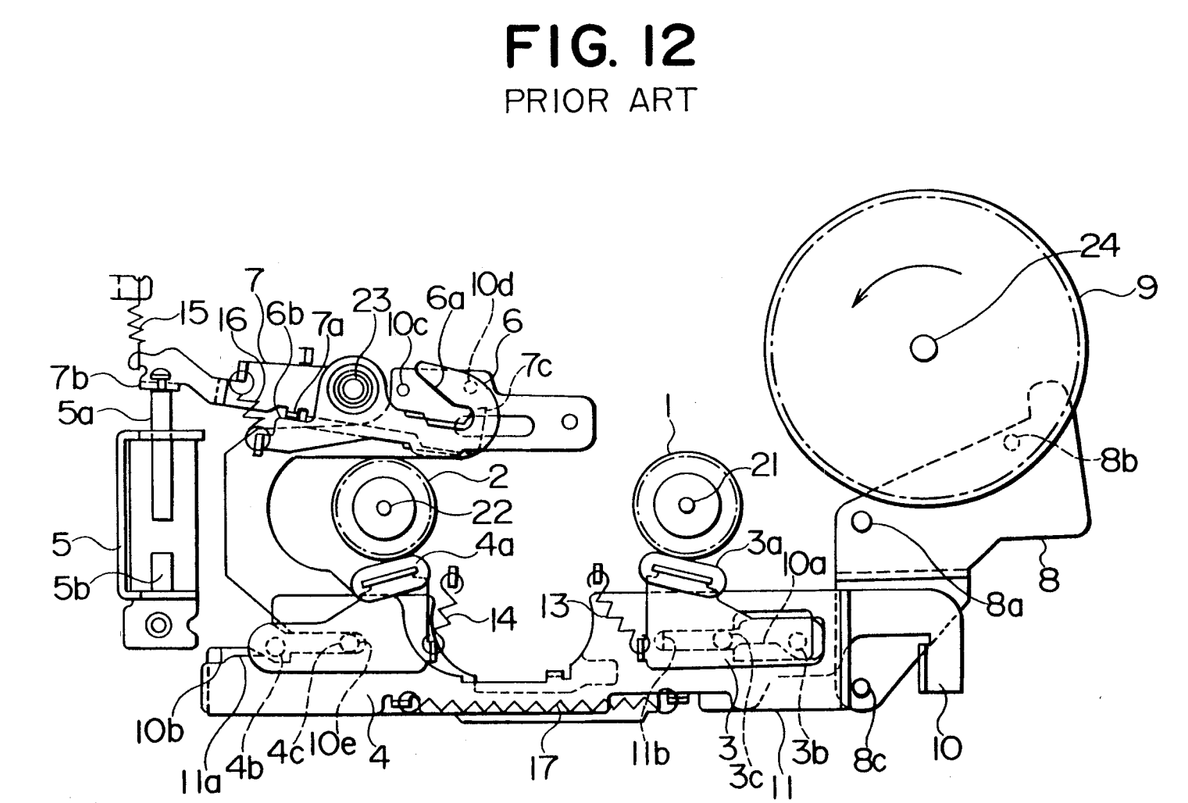
FIG. 12 is a plan view of the main portion of a conventional magnetic tape apparatus upon the completion of the unloading of the magnetic tape.

FIG. 12 is a view of the main portion of a conventional magnetic tape apparatus. Reference numeral 1 is a taking-up reel winder of a taking-up reel gear and, 2 is a feed reel winder of a feed reel gear. Reference numberal 3 is a first reel brake arm on the take-up side with a first reel brake pad 3a on the take-up side for limiting the rotation of the taking-up reel winder 1, a first actuator pin 3b for actuating the first reel brake arm 3 on the taking-up side, and pivot shaft 3c about which the first reel brake arm 3 rotates. Numeral 4 is a second reel brake arm on the feed side with a second reel brake pad 4a on the feed side for limiting the rotation of the feed reel winder 2, a second actuator pin 4b for actuating the second reel brake arm 4 on the feed side, and a pivot shaft 4c about which the second reel brake arm 4 rotates. Numeral 1 is a plunger. 6 is a first lever for pressure-contacting the plunger. 7 is a second lever for holding the operation. 8 is a drive lever for changing the operation with a pivot shaft 8a about which the drive lever 8 rotates, an actuating pin 8b of the drive lever 8, and a drive pin 8c, 9 is a driving rotary cam for rotating the drive lever 8 about the pivot shaft 8a. 10 is a lower plate for controlling operation of the first and second reel brake arms 3 and 4 with a take-up side cam portion 10a formed for controlling the operation of the first reel brake arms 3, and a feed side cam portion 10b for controlling the operation of the second reel brake arm 4. 11 is an upper plate for controlling the first and the second reel brake arms 3 and 4 with a feed side cam portion 10b for controlling the second reel brake arm 4 formed on the upper plate 11.

Figure 13:
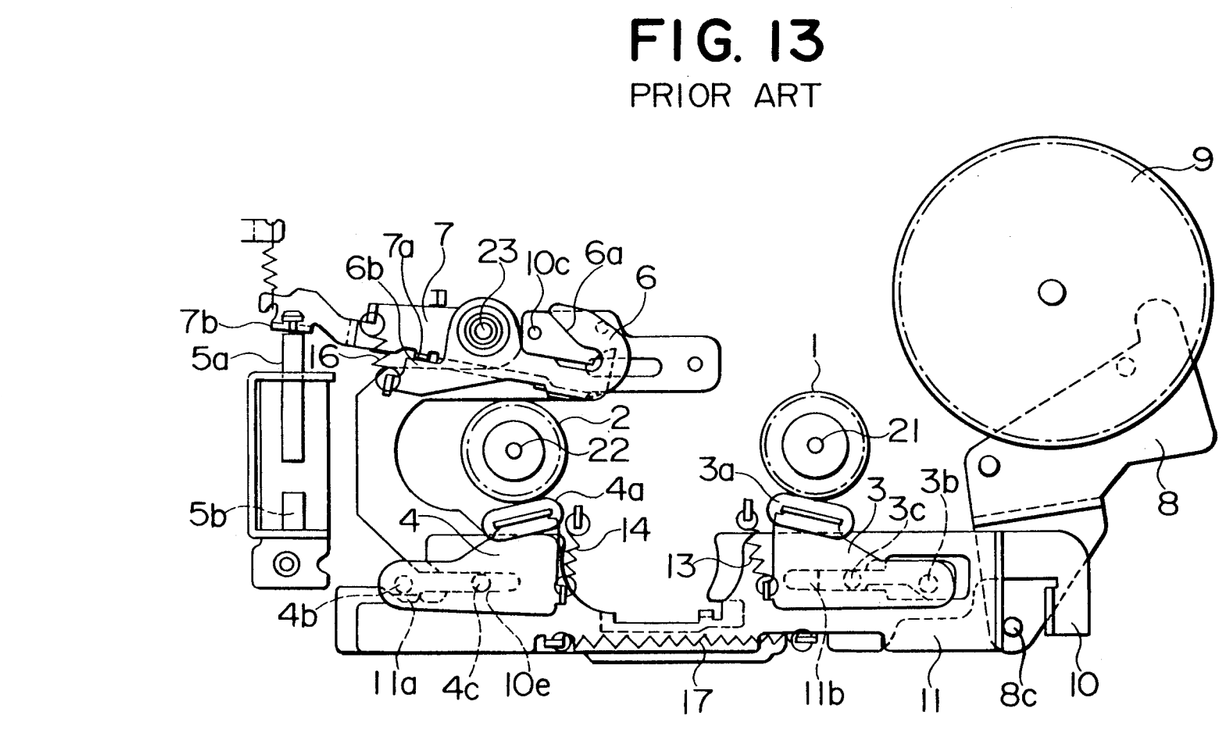
FIG. 13 is a plan view of the main portion of a conventional magnetic tape apparatus upon the loading and the unloading of the magnetic tape.
Figure 14:
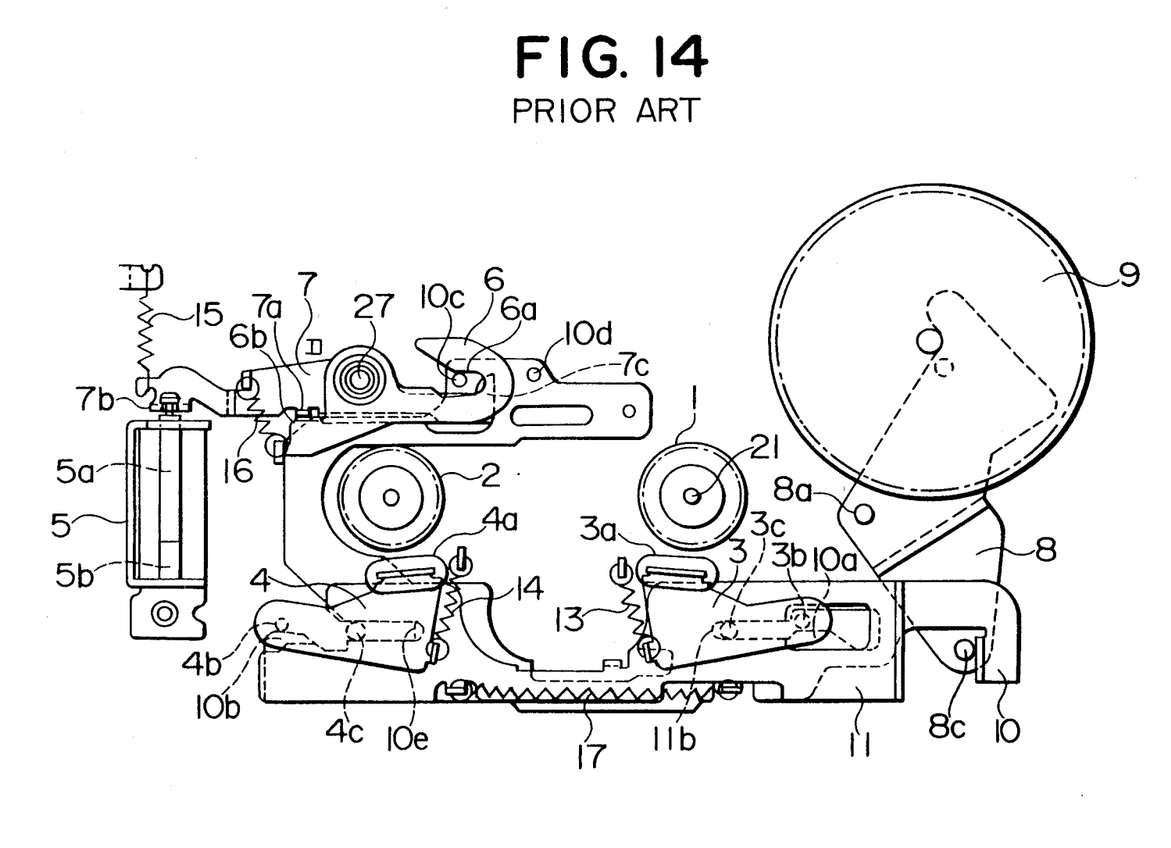
FIG. 14 is a plan view of the main portion of a conventional magnetic tape apparatus upon the recording and reproducing of the magnetic tape.
Figure 15:
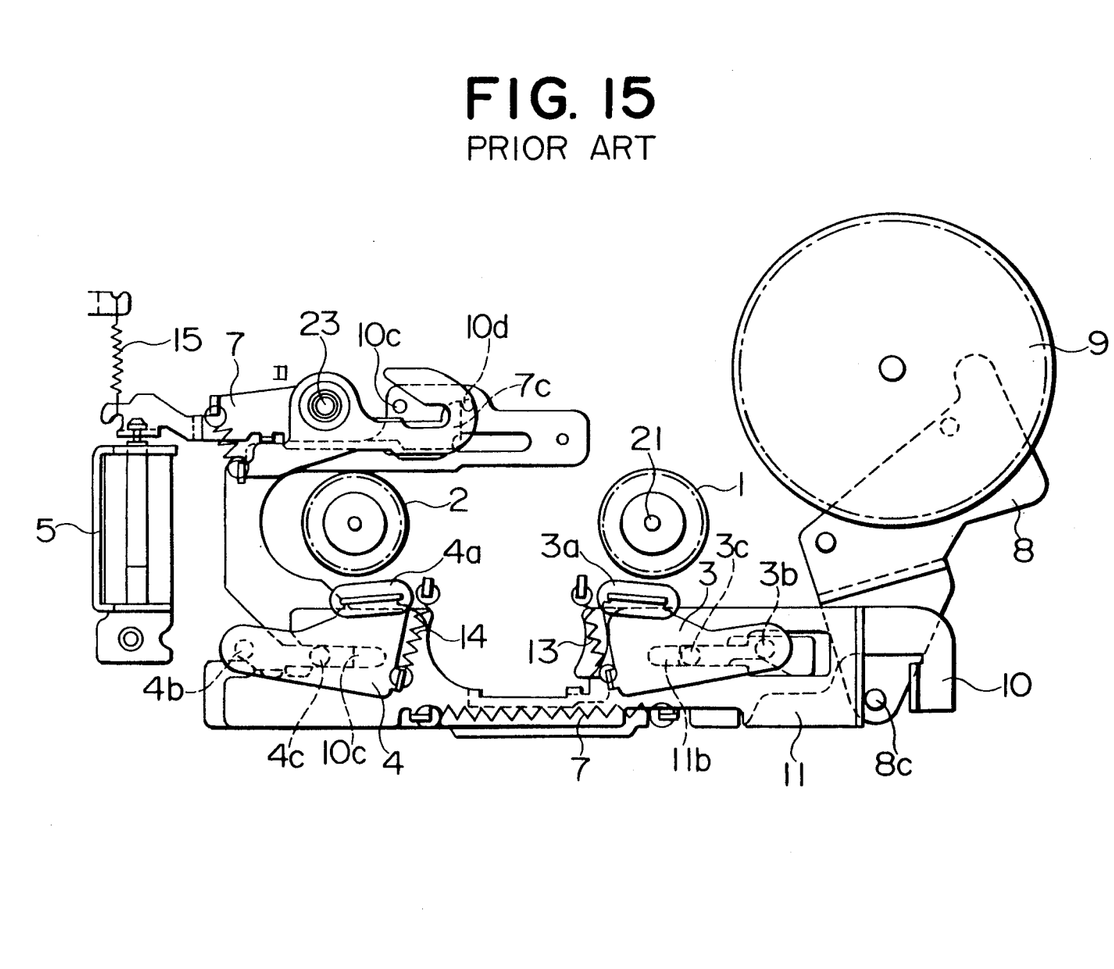
FIG. 15 is a plan view of the main portion of a conventional magnetic tape apparatus upon the quick feed of the magnetic tape.
Figure 16:
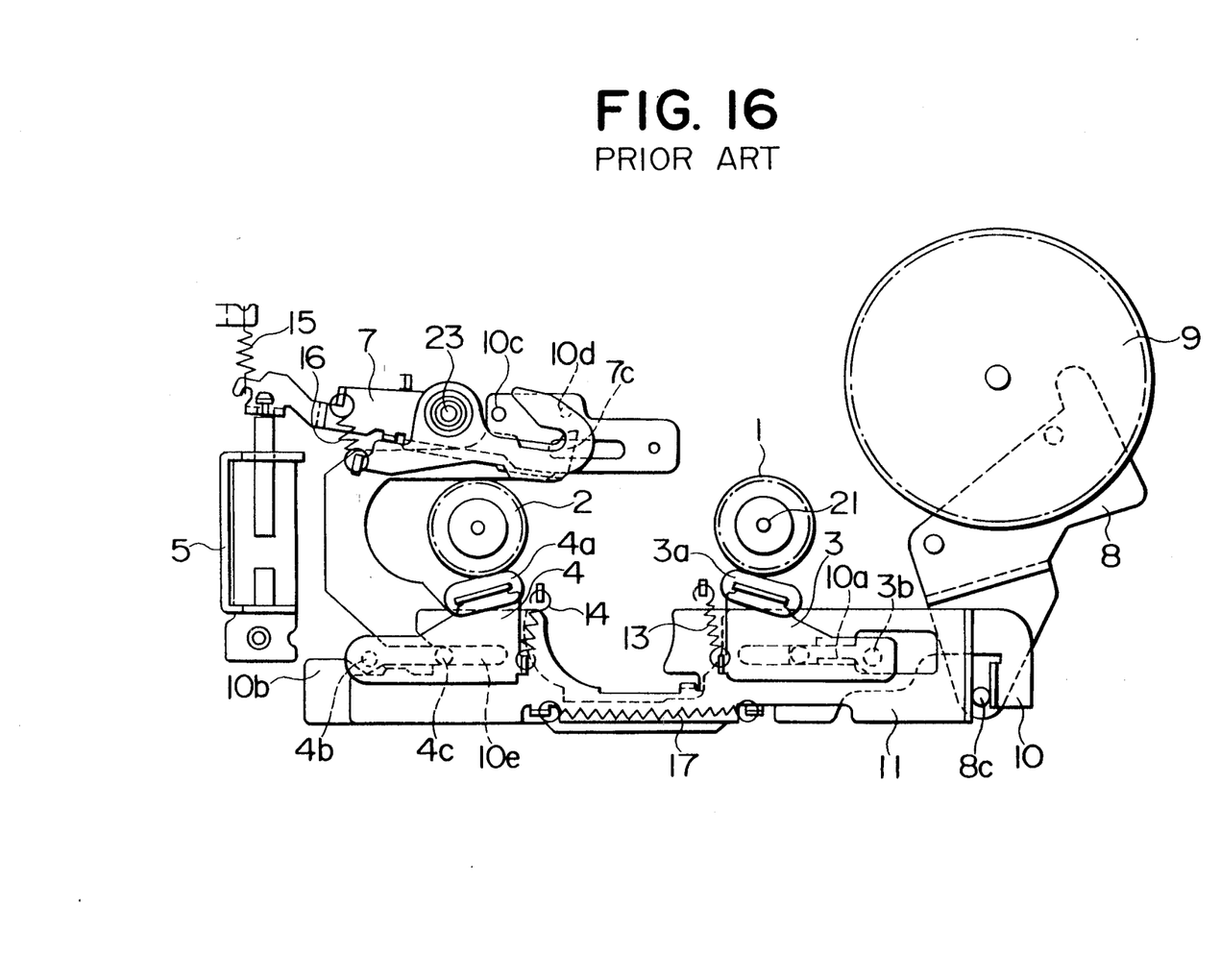
FIG. 16 is a plan view of the main portion of the conventional magnetic tape apparatus upon the instantaneous stoppage of the magnetic tape.

FIG. 12 illustrates the brake mode upon the completion of the unloading or retrieval of the magnetic tape. FIG. 13 illustrates the brake mode upon the loading and unloading of a magnetic tape. FIG. 14 illustrates the brake mode upon the recording or reproducing of a magnetic tape, FIG. 15 illustrates the brake mode upon the quick feed of a magnetic tape. FIG. 16 illustrates the brake mode upon the instantaneous stoppage. The brake modes can be shifted by rotation of the drive lever 8 from that are progressively shown in FIGS. 12-14 during magnetic tape recording and reproducing, from that shown in FIG. 14 through 16 (instantaneous stoppage) during the tape quick feed, and that shown in FIG. 16→FIG. 13→FIG. 12 the magnetic tape take-up operation.

Next, the operation will now be described. FIG. 12 illustrates the reel brake mode in which the unloading of the magnetic tape has been completed and both the take-up reel winder 1 and the feed reel winder 2 are subjected to a braking force by the first and the second reel brake pads 3a and 4a. By rotating the drive pin 8c of the drive lever 8 in a clockwise direction using the rotary cam 9, the upper plate 11 shifts to the left. At this time, the lower plate 10 is prevented from moving to the left because its bent plate end face 10e engages against the pivot shaft 4c.

Therefore, the first and second actuating pins 3b and 4b are in a free state, and each reel brake arm 3 and 4 is pulled respectively by the first and the second springs 13 and 14 so that the first reel brake arm 3 is urged in a clockwise direction and the second reel brake arm 4 is urged in a counter-clockwise direction, and the take-up reel mount 1 and the feed reel mounts 2 are respectively engaged by the reel brake pads 3a and 4a.

Figure 9:
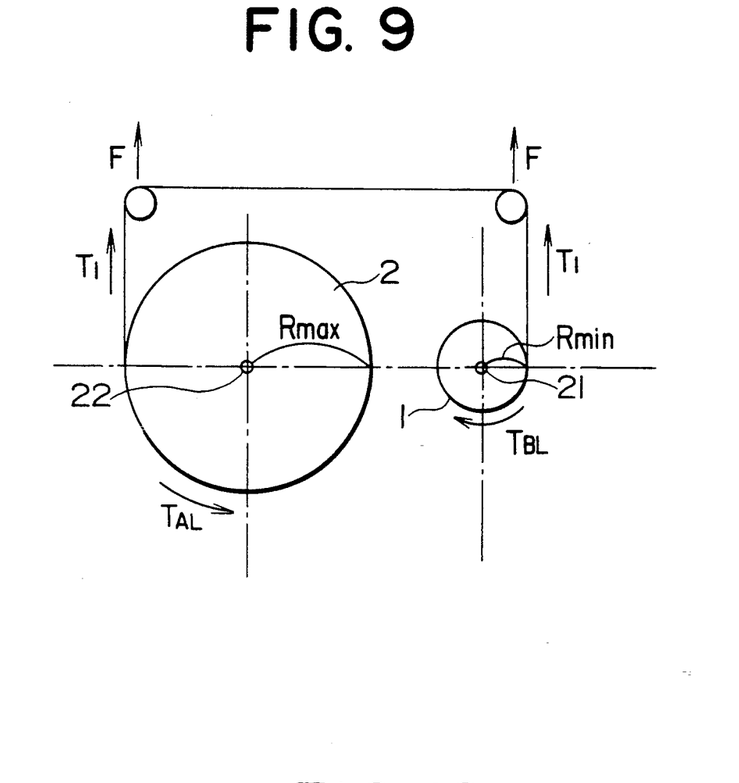
FIG. 9 is a diagram illustrating a relationship between tension forces upon the pulling-out of the magnetic tape.

FIG. 13 illustrates the reel brake mode upon loading of the magnetic tape. From the position shown in FIG. 12, the drive lever 8 is rotated in a counter clockwise by the rotation of the rotary cam 9. Therefore, the upper plate 11 is moved to the right by the elastic force of the third spring 17 connected at its left end to the upper plate 11 and at its right end to the lower plate 10 until the upper plate engages the drive pin 8c and stops. By the movement of the upper plate 11, the actuation pin 4b of the second reel brake arm 4 abuts against the feed side cam portion 11a and the counter-clockwise rotating motion of the second reel brake arm 4 is limited so that the second reel brake pad 4a and the feed reel winder 2 are slightly engaged. The first reel brake arm 3 is in the state similar to FIG. 12, and the brake force of the take-up reel winder 1 is supplied from the first spring 13. When this engagement force (brake torque) is expressed as $T_{BL}$ and, as shown in FIG. 9, when the feed side tape wound diameter is $R_A$ and the take-up side tape wound diameter is $R_S$, then it is always necessary that the feed side brake engagement force (brake torque) $T_{AL}$ has a relationship of $T_{AL}/R_A < T_{BL}/R_S$. This ensures that the magnetic tape for loading is delivered only from the side of the feed reel winder 2. When the loading magnetic tape is at the tape end condition illustrated in FIG. 10, the tape loading (pullingout) force F must satisfy a relationship $F < T_2 = T_{BL}/R_{max}$ in order to pull out the tape from the reel on the shaft 21 while causing the slip of the brake on the reel on the shaft 21. That is, $T_{BL}$ must be made small in order to make the magnetic tape pulling force small. Considering digital audio tape (DAT) recorders for example, since $R_{max} = \phi 36.5$ mm and $R_{min} = \phi 15$ mm, $R_B/R_A \cdot T_{AL} \approx 2.5 \cdot T_{AL}$ (max) $< T_{BL} < F \cdot R_{max}$ must be satisfied.

FIG. 14 illustrates the reel brake mode of the magnetic tape recording and reproducing states once the magnetic tape has been pulled out. The rotation of the rotary cam 9 causes a counter-clockwise rotation of the drive lever 8 to its limit. This causes the lower plate 10 which engages the drive pin 8c to move to the right. Therefore, the take-up side cam portion 10a and the feed side cam portion 10b lift the first and the second actuator pins 3b and 4b, the first and the second reel brake pads 3a and 4a disengage from the reel winders 1 and 2, whereby the reel winders 1 and 2 are brought into a freely rotatable state. At this time, the upper plate 11 is pulled by the third spring 17 and is urged to the right and stopped at a position where the stopper portion 11b abuts against the pivot shaft 3c. At the same time, a plunger pressing lever pressing pin 10c planted in the lower plate 10 is brought into a sliding contact with the cam portion 6a of the first lever 6, so that the first lever 6 which is for pressing the plunger rotates about the rotary central axis 23. At this time, since the engagement end 6b of the first lever 6 disengages from the bent portion 7a of the second lever 7 which is for pressing the plunger, the fourth tension spring 16 causes the second lever 7 to be urged and be rotated in counter-clockwise direction abutting the pivot central axis 23. The plunger contacting portion 7b of the rotated second lever 7 causes the movable iron core 5a of the plunger 5 to be actuated until it abuts against the iron core 5b disposed within the plunger holder.

FIG. 15 illustrates the reel brake mode in the magnetic tape rapid feed state. In the magnetic tape recording and reproducing state as shown in FIG. 14, the plunger 5 is energized and excited so that the movable iron core 5a is magnetically attracted and held and when the rotary cam 9 is rotated to rotate the drive lever 8 in the clockwise direction until immediately before the drive pin 8c abuts against the upper plate 11 of which stopper portion 11b is engaged and blocked by the pivot shaft 3c is shown in FIG. 15. By this operation, the tape quick feed state illustrated in FIG. 15 is realized. By the exciting of the plunger 5, the engagement pin 10d engages against the tip engaging portion 7c of the second lever 7 which is the engaged plunger pressing lever, so that the lower plate 10 is brought into the state where the first and the second reel brake arms 3 and 4 are not engaged with the first and the second reel winders 1 and 2.

FIG. 16 illustrates the reel brake mode in which the instantaneous stoppage from the magnetic tape quick feeding state shown in FIG. 15 has been completed. In the reel brake mode in the quick feeding state shown in FIG. 15, when the plunger 5 is deenergized, the second lever 7 is rotated clockwise by the tension of the fifth spring 15. By this rotation, the engagement portion 7c disengages from the engagement pin 10d, whereby the lower plate 10 is moved in the left-hand direction by the tension force of the third spring 17 until its bent end face 10e abuts and stops against the pivot shaft 4c. At this time, the first and the second actuation pins 3b and 4b disengage from the take-up side cam portion 10a and the feed side cam portion 10b to release the first and the second reel brake arms 3 and 4. The first reel brake arm 3 is rotated by the tension forced of the first spring 13 so that the first reel brake pad 3a engages against the take-up reel winder 1 to brake its rotation. The second reel brake arm 4 is rotated by the tension force of the second spring 14 so that the second reel brake pad 4a engages against the feed reel winder 2 to brake its rotation.

Next, the reel brake mode upon the magnetic tape unloading will be described. The feed reel winder 2, to which the second reel brake pad 4a is slightly engaged in the same mode as the reel brake mode upon the magnetic tape loading as shown in FIG. 13, is rotated in the counterclockwise direction by a power transmission mechanism (not shown) to take up the magnetic tape. The torque relationship at this time will now be discussed.

Figure 10:
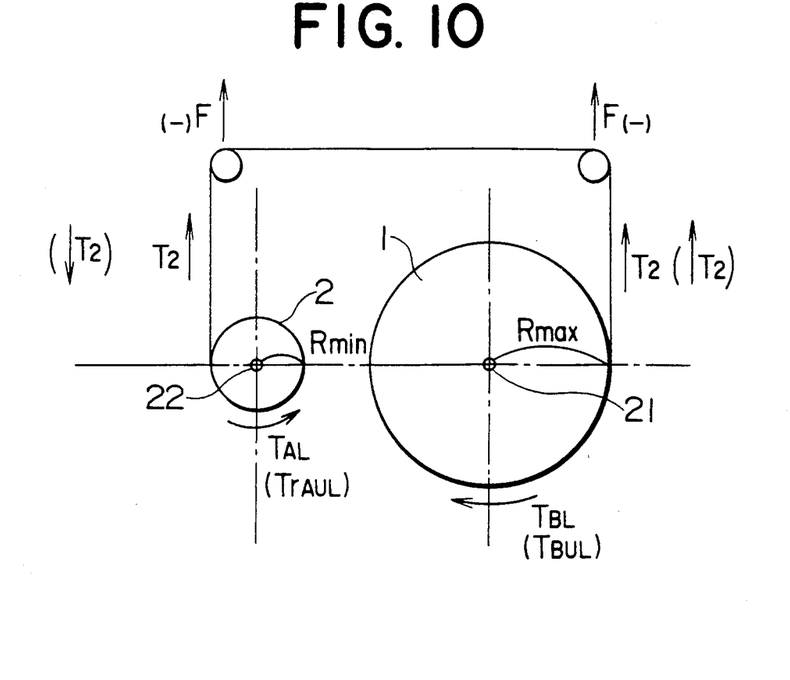
FIG. 10 is a diagram illustrating a relationship between tension forces upon the unloading of the magnetic tape.
Figure 11:
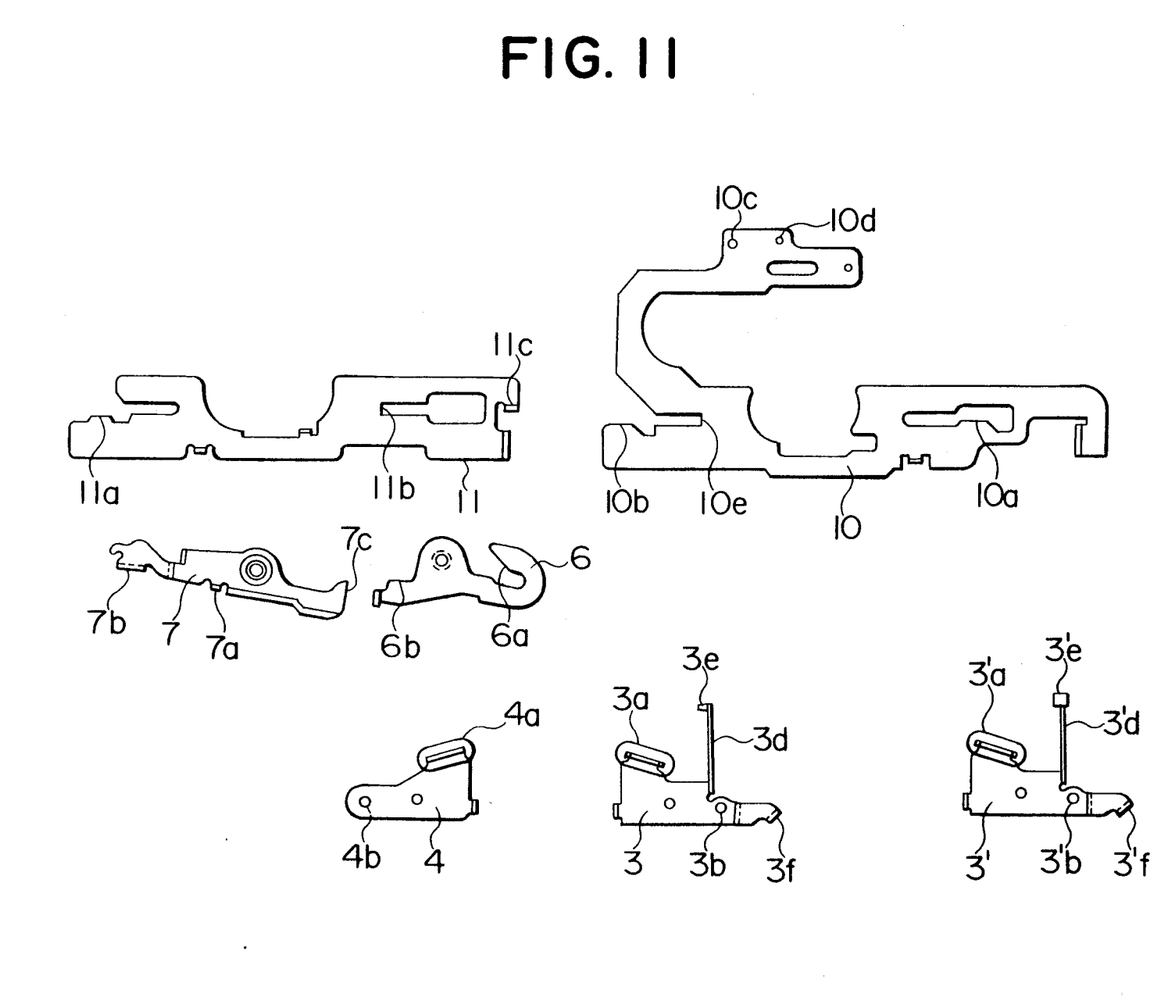
FIG. 11 is a plan view of the details of the components of embodiment 1 of the present invention.

The take-up reel winder 1 shown in FIG. 13 is given a brake torque of $T_{BUL}$ ($=T_{BL}$) in FIG. 10. When the winding torque at the time of taking up the tape of the feed reel winder 2 is $T_{rAUL}$, then in order that the feed reel winder 2 takes up the magnetic tape without simultaneously rotating the take-up reel winder 1, a relationship $T_{rAUL}/R_{min} < T_{BUL}/R_{max}(=T_{BL}/R_{max})$ must be satisfied.

That is, $T_{rAUL} < R_{min}/R_{max} \cdot T_{BL} = 0.4\ T_{BL}$ (for DAT min.) must be held. As understood from this, for an appropriate magnetic tape loading force F, $T_{BL}$ must be small, and for a small $T_{BL}$, $T_{rAUL}$ must be further small.

The cassette pack discharge operation after unloading the magnetic tape is achieved after the shifted as shown in FIG. 13 to FIG. 12. During this shift, the first and the second reel brake arms 3 and 4 keep the taking up reel winder 1 and the feed reel winder 2 braked.

Since the conventional magnetic tape apparatus is constructed as above described, in order to keep the magnetic tape loading force small, the reel brake force must be small and the magnetic tape take-up torque upon the magnetic tape unloading torque must be even smaller. Thus when the taking-up torque is increased within the cassette half due to a magnetic tape winding disturbance, when the magnetic tape is released outwardly of the cassette half for any reason, and when the magnetic tape is disturbed by the magnetic tape being caught outside the cassette half, the magnetic tape cannot be unloaded or retrieved into the cassette due to an insufficient taking-up torque during unloading of the magnetic tape.

Also, when the winding torque upon the magnetic tape unloading is made large so that the magnetic tape can be taken up even when the magnetic tape is disturbed, the magnetic tape is pulled by the magnetic tape unloading side reel (A side) and the non-feeding side reel (B side) is forced to rotate, whereby the tape position before and after the unloading of the magnetic tape shifts and, when the tape is to be reproduced, the reproducing position is substantially shifted from the previous reproducing prior to the unloading of the magnetic tape.

SUMMARY OF THE INVENTION

This invention has been made in order to solve the above discussed problems and has as its object the provision of a magnetic tape apparatus in which the take-up torque upon the tape unloading can be increased without increasing the pull-out force, so that the tape can be unloaded even when the tape is disturbed and the tape position does not shift.

With the above object in view, the magnetic tape apparatus of the present invention comprises a first and a second reel winder rotatable in the clockwise or counterclockwise direction and a first and a second reel brake arm for providing a braking force to the first and second reel mounts. The first reel mount is provided, upon loading a magnetic tape, with a braking force greater than a small braking force provided to the second reel mount. The magnetic tape apparatus is provided with locking means for locking the first reel winder upon unloading the magnetic tape into a cassette half. The magnetic tape apparatus may alternatively comprise braking means for providing the first reel winder upon unloading the magnetic tape into a cassette half with a braking force greater than that provided upon the pulling out of the magnetic tape.

According to the magnetic tape apparatus of the present invention, the first reel winder which is the feed side upon the magnetic tape unloading is stopped in the locked state or with a large braking force, so that the take-up torque on the second reel winder on the winding side can be large, thereby ensuring the reliable take-up of the magnetic tape. Also, it is not happen that the magnetic tape is pulled by the second reel winder and the first reel winder is rotated and that the magnetic tape position shifts.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

An embodiment of the present invention will now be described in conjunction with the drawings. FIGS. 1 to 7 and 11 are plan views illustrating the main portion of one embodiment of the present invention, the components identical or corresponding to those of a conventional apparatus are designated with the same reference numerals and their description will be omitted.

In the figures, reference character $3d$ is a locking arm for locking a reel gear on the take-up reel winder 1, $3e$ is a locking pawl for engaging the reel gear when the reel gear is to be locked $3f$ is a cam portion for actuating the locking arm and $11c$ is an arm portion for controlling the actuation of the locking arm $3d$. The locking arm $3d$ and the locking pawl $3e$ together constitute a locking means.

Figure 1:
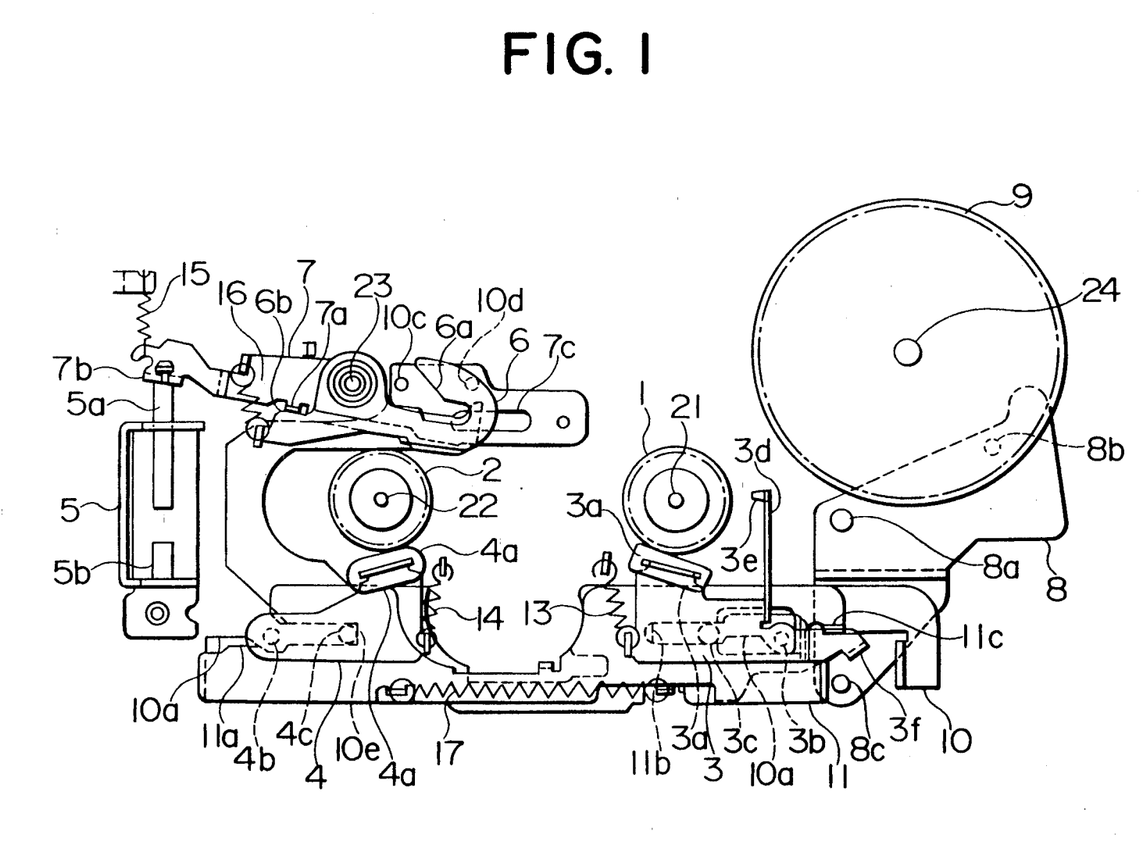
FIG. 1 is a plan view of the main portion of the magnetic tap apparatus of the present invention upon the completion of the unloading of the magnetic tape of embodiment 1.
Figure 2:
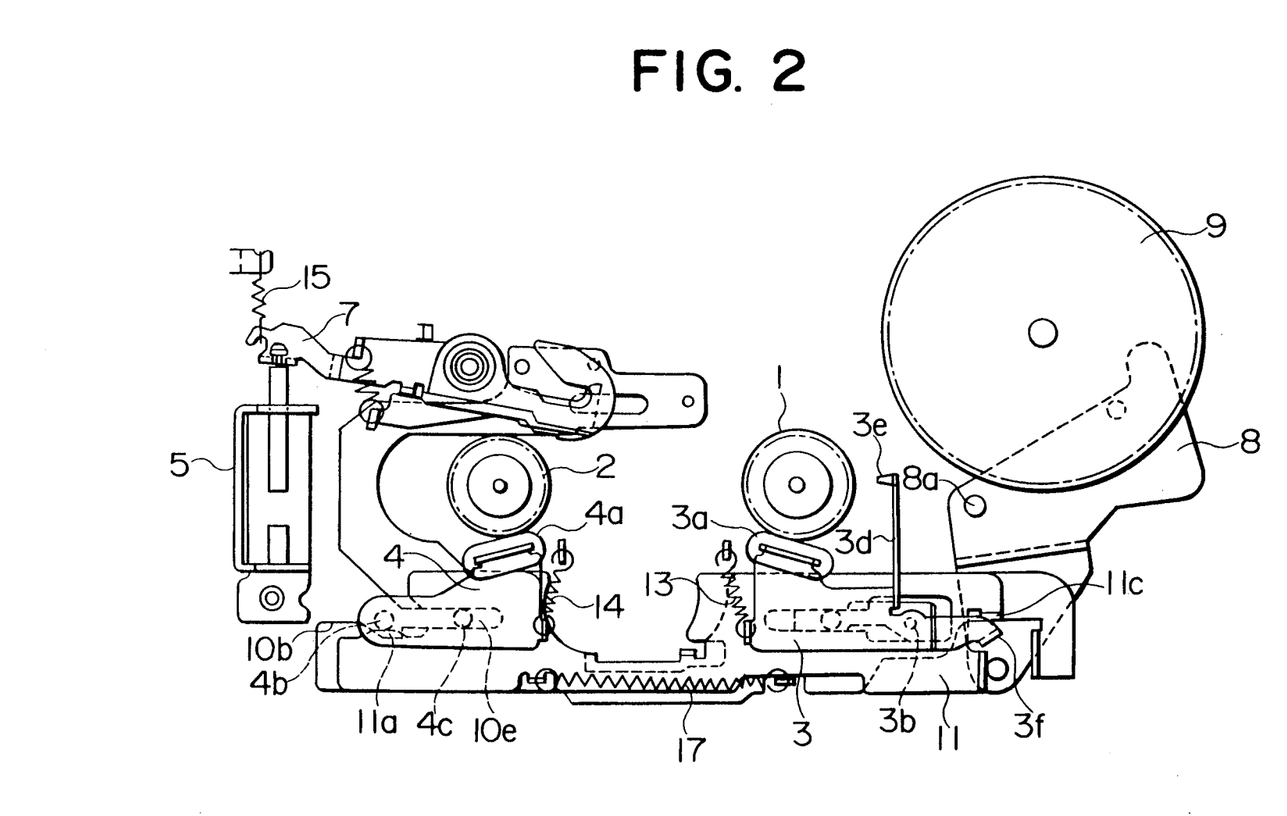
FIG. 2 is a plan view of the main portion of the magnetic tap apparatus of the present invention upon the pulling-out or loading of the magnetic tape of embodiment 1.
Figure 3:
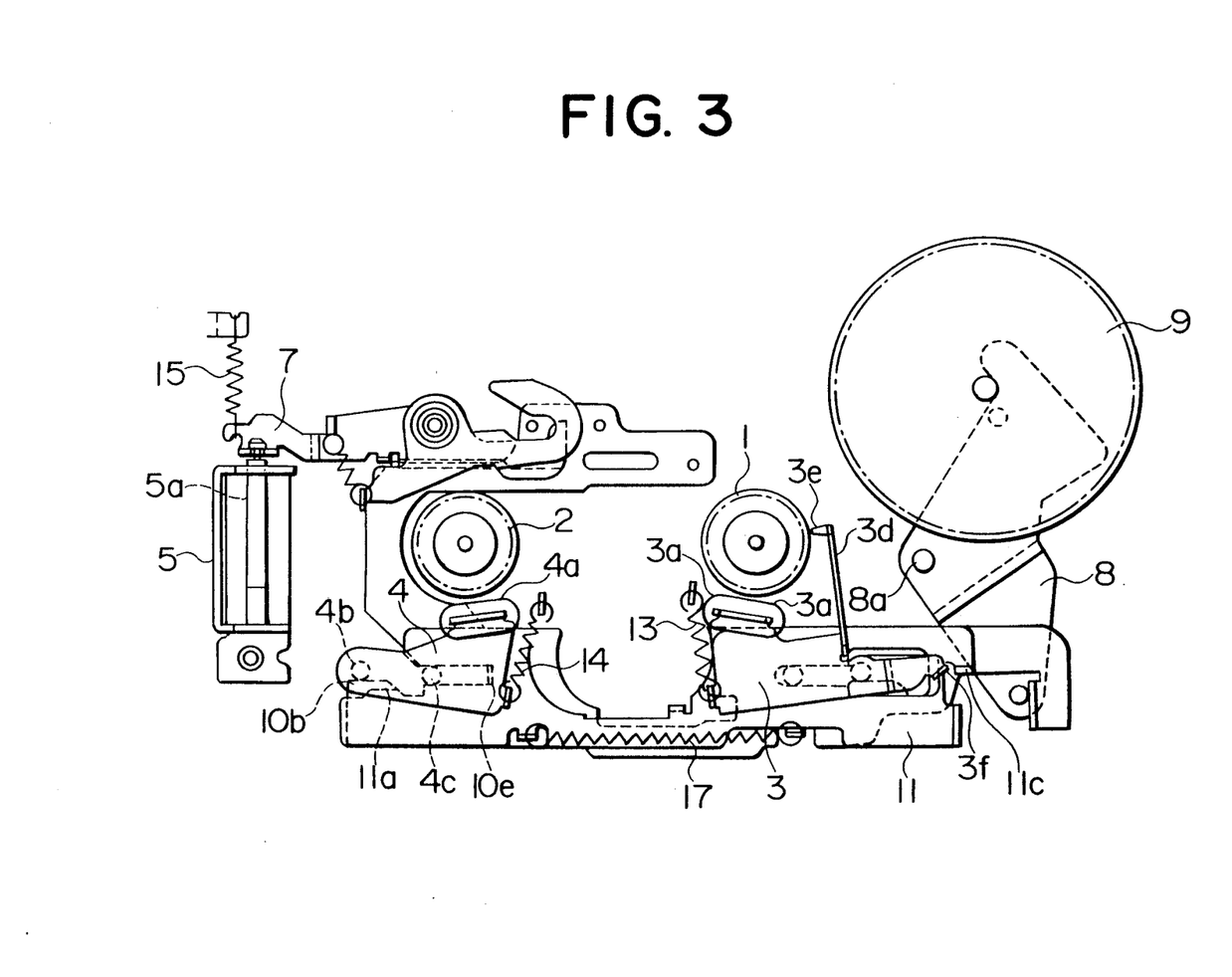
FIG. 3 is a plan view of the main portion of the magnetic tap apparatus of the present invention upon the recording and reproducing of the magnetic tape of embodiment 1.
Figure 4:
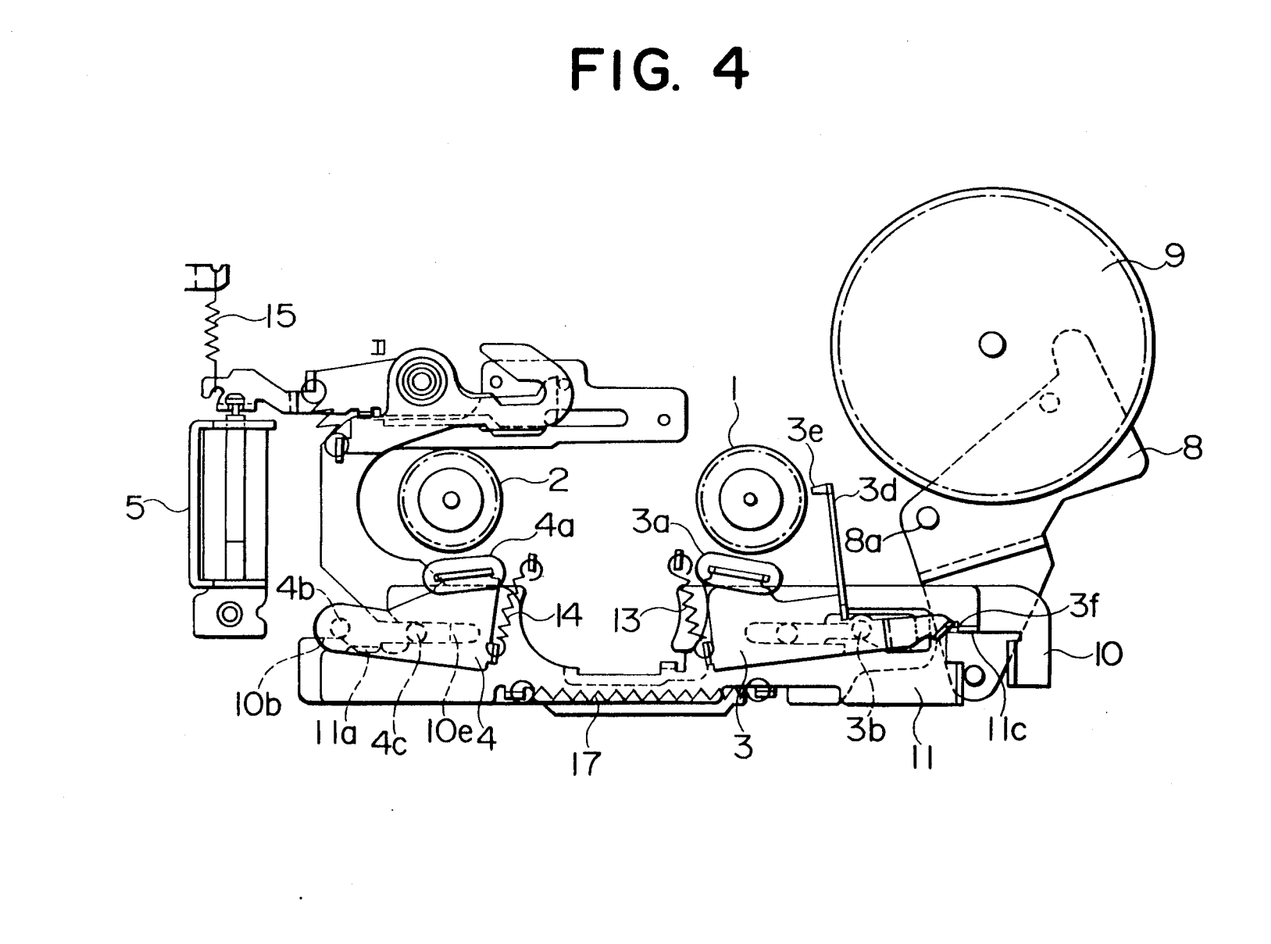
FIG. 4 is a plan view of the main portion of the magnetic tap apparatus of the present invention upon the quick feed of the magnetic tape of embodiment 1.
Figure 5:
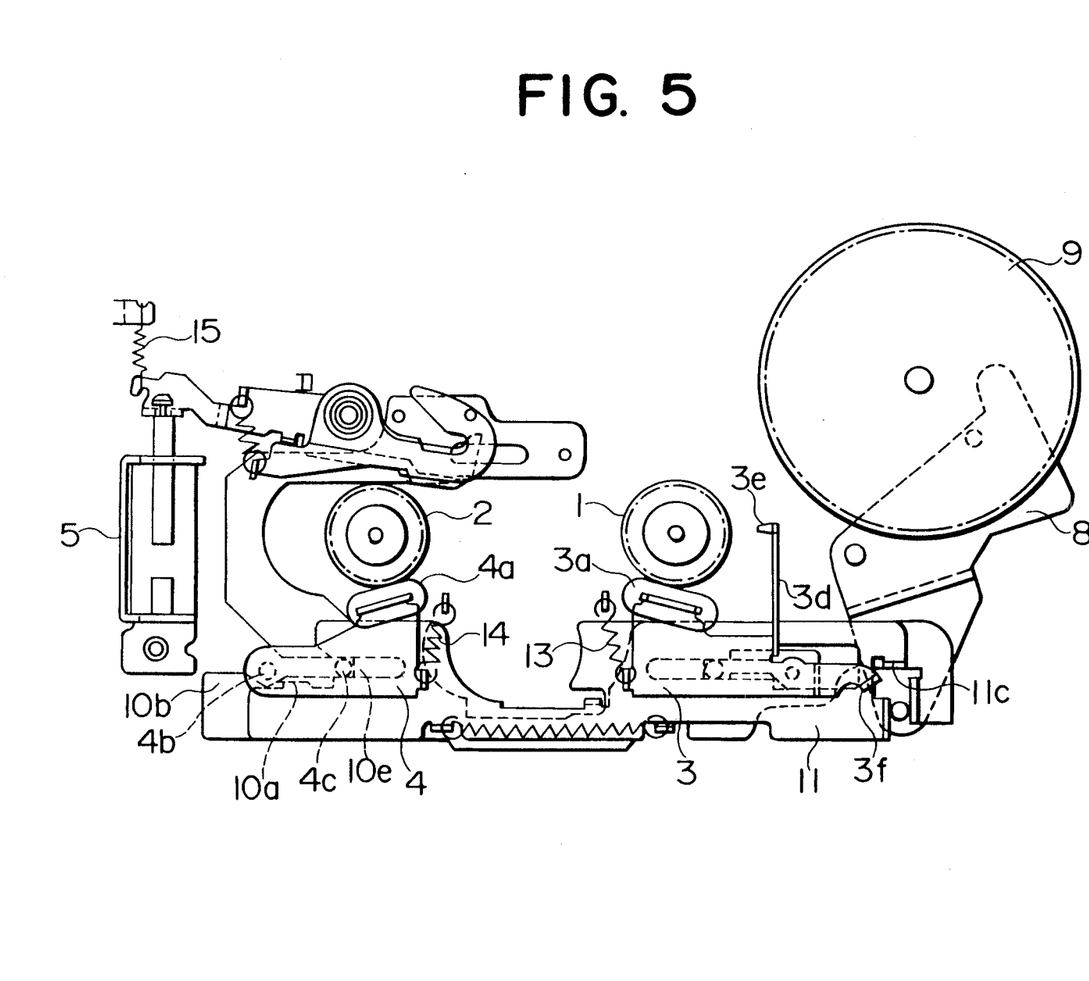
FIG. 5 is a plan view of the main portion of the magnetic tap apparatus of the present invention upon the instantaneous stoppage of embodiment 1.
Figure 6:
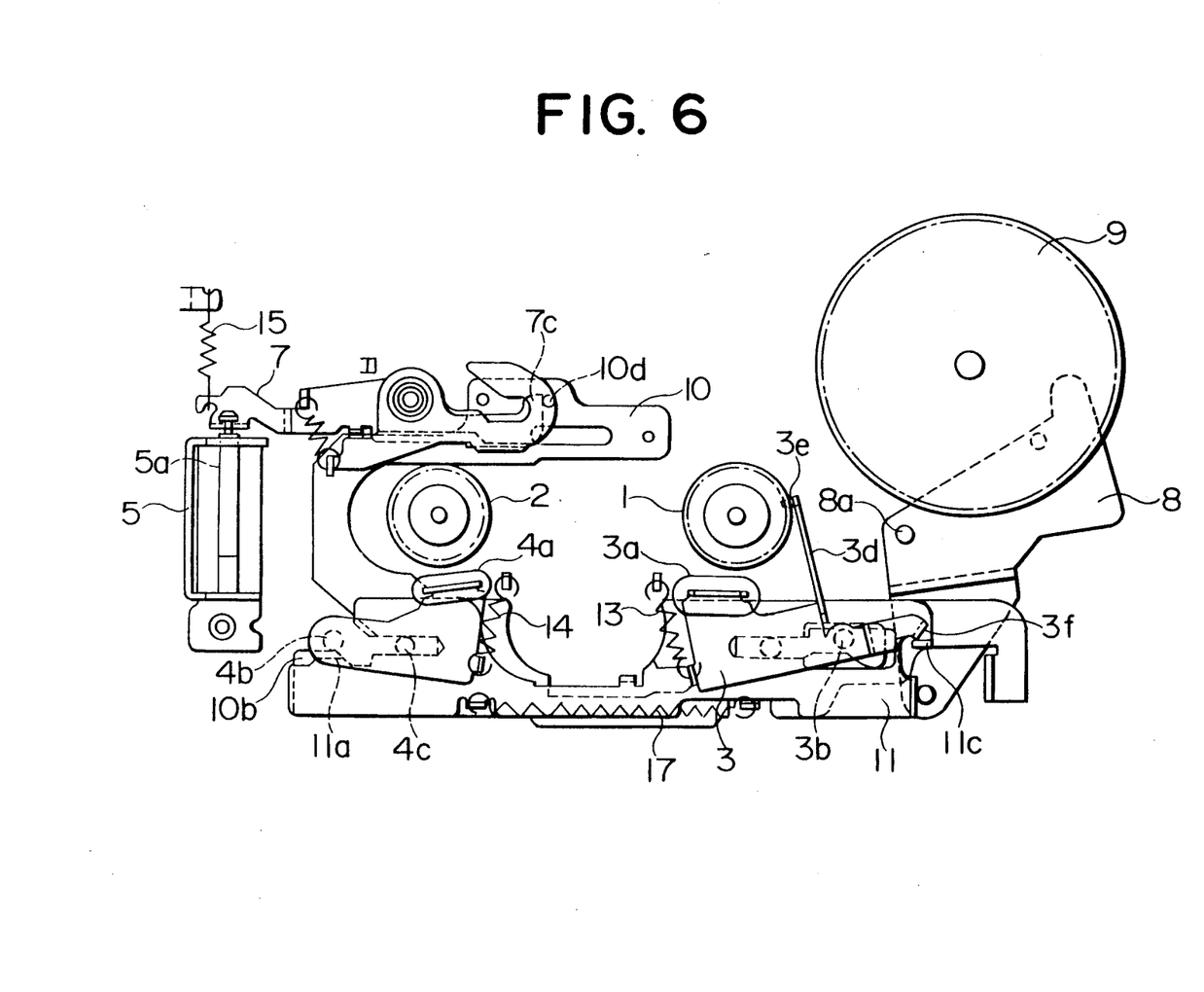
FIG. 6 is a plan view of the main portion of the magnetic tap apparatus of the present invention upon the unloading of the magnetic tape of embodiment 1.
Figure 7:
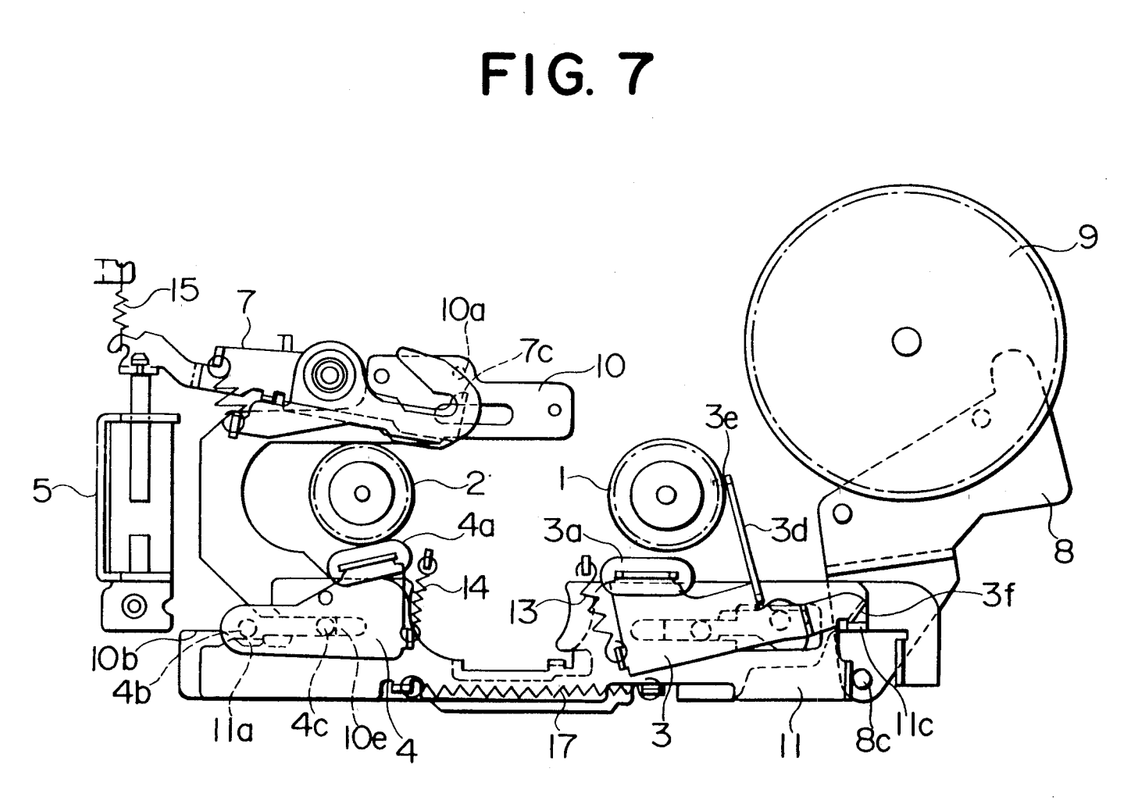
FIG. 7 is a plan view of the main portion of the magnetic tape apparatus of the present invention upon the brake changing of embodiment 1.

FIG. 1 illustrates the brake mode upon the completion of the unloading or retrieval of the magnetic tape, FIG. 2 illustrates the brake mode upon the loading or development and unloading of the magnetic tape, FIG. 3 illustrates the brake mode when recording or reproducing of the magnetic tape, FIG. 4 illustrates the brake mode upon the quick feed of the magnetic tape, FIG. 5 illustrates the brake mode upon the instantaneous stoppage, FIG. 6 illustrates the brake mode upon the unloading of the magnetic tape and FIG. 7 illustrates the brake mode upon the braking change.

The brake modes can be shifted by the drive lever 8 from FIG. 1→FIG. 2→FIG. 3 during magnetic tape recording and reproducing, from FIG. 3→FIG. 4→FIG. 5 (instantaneous stoppage) during the tape quick feed operation, and from (FIG. 5→) FIG. 3→FIG. 6→FIG. 7→FIG. 1 upon the magnetic tape unloading.

In the magnetic tape apparatus constructed as above described, as for FIGS. 1 to 5, the operations, functions and the relationships between forces are identical to those of the conventional apparatus shown in FIGS. 10 to 14. It is to be noted that the locking pawl $3e$ does not abut against the take-up reel winder 1 which is the first reel winder and the operation of the take-up reel winder 1 is limited only by the first reel brake pad $3a$.

FIG. 6 illustrates the reel mode upon the tape unloading. In the tape recording and reproducing state shown in FIG. 3, the plunger 5 is energized and excited to magnetically attract and hold the plunger's movable iron core $5a$, and the rotary cam 9 is rotated to cause the rotation of the drive lever 8 clockwise about the pivot shaft $8a$ until the drive lever 8 reaches the same position as the drive lever 8 upon the tape loading shown in FIG. 2 through the tape quick feed reel mode shown in FIG. 4.

During the shifting from FIG. 4 (quick feed) to FIG. 6 (unloading), the upper plate 11 moves to the left and the arm portion $11c$ integral with the upper plate 11 abuts against the cam portion $3f$ of the first reel brake arm 3 so that the cam portion $3f$ is rotated counter-clockwise against the tension force of the first spring 13 by the movement of the brake upper plate 11 until it abuts and engages the arm portion $11c$. At this time, the locking pawl $3e$ integral with the first reel brake arm 3 engages the reel gear integral with the take-up reel winder 1, so that the take-up reel winder 1 is engaged and locked by the locking pawl $3e$. At this time, the feed reel winder 2 is freely rotatable.

In the tape unloading brake mode as above described, the feed reel winder 2 which is the second reel winder is rotated counter-clockwise by a power transmission mechanism to take up the magnetic tape. Since the take-up reel winder 1 is locked by the locking pawl $3e$, the take-up reel winder 1 (non-take-up side reel B side) is not rotated even when the feed reel winder 2 (A side) rotates at a large torque. It is to be noted that, in FIG. 10, $T_{BUL} = \infty$, so that $T_{rAUL} < \infty$, and the take-up torque of $T_{rAUL}$ upon tape unloading can be determined at will. Also, since the feed reel winder 2 (A side) can be rotated at a large torque, the magnetic tape which requires an increased taking-up torque due to winding disturbance, the magnetic tape caught by a roller pin and the magnetic tape wound on the rotary cylinder can be forcedly taken up.

FIG. 7 illustrates the brake mode during the brake change after the tape unloading shown in FIG. 6. After the tape unloading shown in FIG. 6, the plunger 5 is deenergized so that the second lever 7 is rotated clockwise by the tension force of fifth spring 15. By this rotation, the engagement portion $7c$ is released from the engagement pin $10d$ and the lower plate 10 is moved to the left by the tension force of the third spring 17 until its bent end face 10e abuts against the pivot shaft 4c. At this time, the feed side cam portion 10b disengages from the second actuating pin 4b to release the second reel brake arm 4. This results in the movement of the second reel brake arm 4 by the tension force of the second spring 14 in which the second actuating pin 4b abuts against the feed side cam portion 11a and the second reel brake pad 4a slightly engages against the feed reel mount 2 to limit the rotation of the feed reel winder 2. At this time, the take-up reel winder 1 is kept in the locked state since the arm 11c is engaged by the cam portion 3f and the locking pawl 3e remains engaged with the take-up reel mount 1.

Next, the reel mode shifts from FIG. 7 to the reel mode after the completion of the tap unloading shown in FIG. 1. First, the drive lever 8 of FIG. 7 rotates clockwise to its limit by the rotation of the rotary cam 9. This causes the upper plate 11 which abuts against the drive pin 8c to move to the left. The cam portion 3f is disengaged from the arm portion 11c, the first reel brake arm 3 rotates in the clockwise direction, the first reel brake pad 3a engages the take-up reel mount 1, whereby the rotation of the take-up reel mount 1 is limited. This state is the reel brake mode after the completion of the tape unloading shown in FIG. 1 and this is the initial state.

Figure 8:
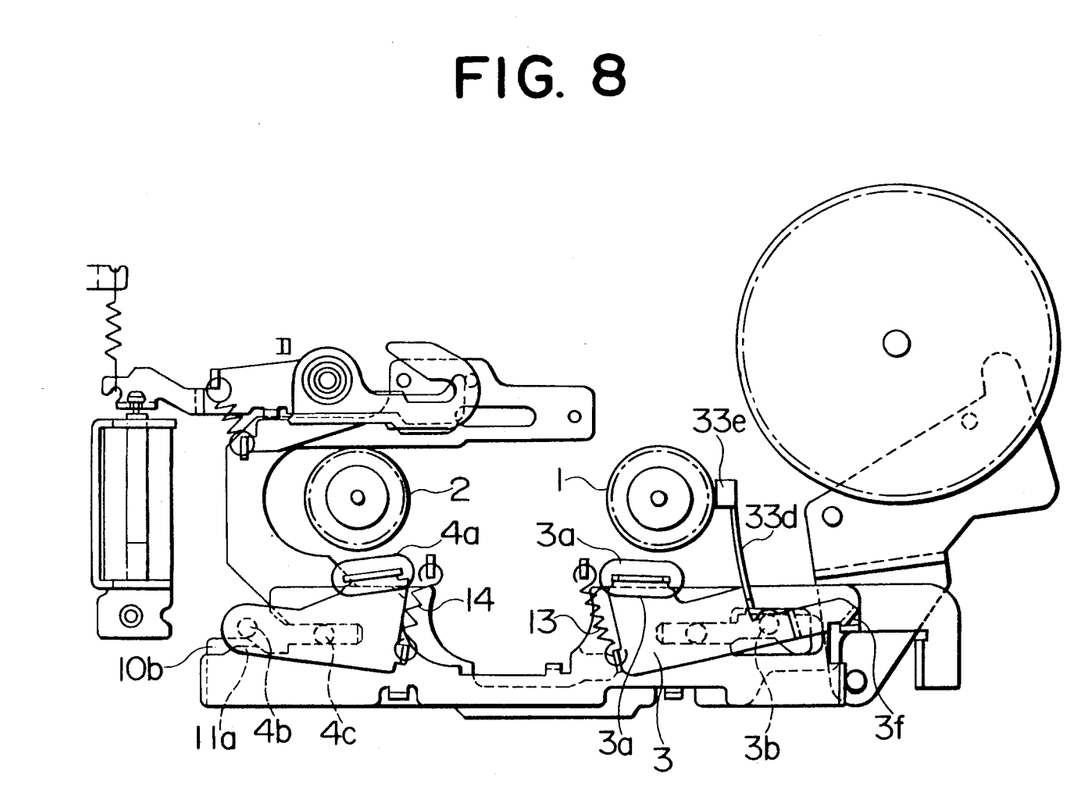
FIG. 8 is a plan view of the main portion of the magnetic tap apparatus of the present invention upon the unloading of the magnetic tape of embodiment 2.

While the locking of the take-up reel mount 1 is achieved by the locking pawl 3e engageable engaged with the reel gear in the above embodiment 1, similar advantageous results can be obtained by utilizing, as shown in FIG. 8, a locking pad 33e in lieu of the locking pawl 3e and an elastic locking arm 33d in lieu of the locking arm 3d. The locking pad 33 e and the elastic locking arm 33d together constitute the brake means.

As for FIGS. 1 to 5 and 7, the operations are identical to those previously described, so that their descriptions will be omitted, but only FIG. 8 will be described in place of the tape unloading shown in FIG. 6.

Similarly to the state shown in FIG. 6 in conjunction with embodiment 1, the locking pad 33e of the take-up side reel brake arm 3 rotated in the counter-clockwise clockwise direction is elastically pressed against the reel mount 1 by the elastic locking arm 33d. This causes the rotation of the reel mount 1 to be limited to provide a large braking force. It is to be noted that, since $T_{BUL} > T_{BL}$ in FIG. 10, $T_{rAUL} < 0.4 T_{BL}$, but the taking-up torque of $T_{rAUL}$ upon the tape unloading can be set at a sufficiently large value. The shift of the brake mode in the above embodiment 2 is the same that that of embodiment 1.

As has been described, according to the magnetic tape apparatus of the present invention, a locking means or braking means for preventing the rotation of the reel mount on the non-take-up side only during magnetic tape unloading are provided, so that the take-up torque of the take-up side reel winder can be increased during magnetic tape unloading function. Therefore, even when the take-up torque is increased within a cassette half due to the magnetic tape winding disturbance, even when the magnetic tape is released outwardly of the cassette half for any reason, and even when the magnetic tape is disturbed such by the magnetic tape being caught outside the cassette half, the magnetic tape can be reliably unloaded or retrieved into the cassette. Also, it cannot happen that the first reel winder on the non-take-up side is forced to rotate by the second reel winder on the take-up side and that the tape position shifts and, when the tape is to be reproduced, the reproducing position is substantially shifted from the previous reproducing prior to the unloading of the magnetic tape.

A further advantageous result occurs in that the magnetic tape loading force can be set to be smaller than or equal to that of the conventional design can be obtained.

What is claimed is:

1. A magnetic tape apparatus comprising:
   first and second reel winders rotatable in a clockwise or counter-clockwise direction for receiving a magnetic tape;
   first and second reel brakes for providing a braking force to said first and second reel winders while loading the magnetic tape such that the braking force applied to said first reel winder by the first reel brake is comparatively greater than the braking force provided to said second level winder by the second reel brake;
   locking means for locking said first reel winder against rotation while disengaging both said first and second brakes allowing said second winder reel to turn freely when unloading said magnetic tape.

2. A magnetic tape apparatus as recited in claim 1, wherein said locking means includes a locking arm extending from said first reel brake for engaging said first reel winder upon disengagement of said first reel brake for preventing the rotation of said first reel winder.

3. A magnetic tape apparatus as claimed in claim 2, wherein said locking means further comprises a locking brake pad attached to said locking arm for engaging said first reel winder upon disengagement of said first reel brake for preventing the rotation of said first reel mount.

4. A magnetic tape apparatus as recited in claim 2, wherein said locking means further comprises a locking pawl attached to said locking arm for engaging said first reel winder upon disengagement of said first reel brake for preventing rotation of said first reel mount.

5. A magnetic tape apparatus as recited in claim 2, wherein said locking arm is formed of an elastic material.

6. A magnetic tape apparatus as recited in claim 5, wherein said locking means further comprises a locking pad attached to said locking arm for engaging said first reel winder upon disengagement said first reel brake for preventing rotation of said first reel mount.

7. A magnetic tape apparatus as recited in claim 1, wherein said locking means comprises braking means for applying a braking force to said first reel winder which is greater during unloading than loading of said magnetic tape.

* * * * *